United States Patent [19]

Rossides

[11] Patent Number: 5,359,508
[45] Date of Patent: Oct. 25, 1994

[54] DATA COLLECTION AND RETRIEVAL SYSTEM FOR REGISTERING CHARGES AND ROYALTIES TO USERS

[76] Inventor: Michael T. Rossides, 3666 Upton St., NW., Washington, D.C. 20008

[21] Appl. No.: 72,386

[22] Filed: May 21, 1993

[51] Int. Cl.[5] .................... G06F 15/00; H04M 1/64
[52] U.S. Cl. .................... 364/401; 364/402; 379/112; 379/114; 379/121; 379/126
[58] Field of Search ................ 364/401, 402; 379/112, 379/114, 121, 126, 213

[56] References Cited

U.S. PATENT DOCUMENTS

| | | | |
|---|---|---|---|
| 4,054,756 | 10/1977 | Comella et al. | 379/89 |
| 4,585,904 | 4/1986 | Mincone et al. | 379/88 |
| 4,850,007 | 7/1989 | Marino et al. | 379/67 |
| 5,003,584 | 3/1991 | Benyacar et al. | 379/119 |
| 5,008,929 | 4/1991 | Olsen et al. | 379/112 |

Primary Examiner—Gail O. Hayes
Assistant Examiner—Gita D. Shingala

[57] ABSTRACT

Self-organizing data-base that charges users who find data in it and pays users who supply the data found. Has a built in feedback mechanism, called the Pay-off Meter (POM), that tells users what data needs supplying based on the number of request for that data over time. The POM outputs an expected Pay-off for supplying a piece of data. A sensitive and potent feedback loop is created insuring that the more a piece of data is requested during a period of time, the more likely the data will be supplied by a requestor or by someone a requestor tells of the pay-off.

1 Claim, 3 Drawing Sheets

DATA COLLECTION AND RETRIEVAL SYSTEM FOR REGISTERING CHARGES AND ROYALTIES TO USERS

BACKGROUND

In building any data-base for a community to use, two general problems often arise: what data to collect and how to collect it. For example, the problem of how to collect data has prevented the formation of a complete and current U.S. data-base of phone numbers not controlled by the Bell companies. The problem is only worse when an international directory is contemplated. And it is even worse when networks like Internet are involved. On these networks, there is no "phone company" to forcibly register people's numbers. The problem of what data to collect can be equally vexatious. There are an infinite number of pieces of information one could enter into a data-base. How to know, for example, whether to list a certain phone number or obscure fact?

A system and method for solving these two problems in a broad range of cases is disclosed. It enables a database to fill itself and update itself with data that users need. This system and method can be called a self-organizing data-base (SODB). The inventor is not aware of any data-base system and method like the SODB. The SODB allows users who pay for data to also enter data and get paid royalties for doing so. Further, the SODB allows paying users to automatically find out the estimated royalty value of entering data. While other data-bases have allowed users to check the income a piece of data might generate, none have opened this route so directly to paying users in an elegant feedback system like the SODB.

SUMMARY

The SODB is a data-base that charges users who find data in it and pays users who supply the data found. The key to the SODB is a built in feedback mechanism, called the Pay-off Meter, that tells users what data needs supplying based on the number of requests for that data. When a person requests a piece of data not in the SODB, the Pay-off Meter registers the request. Based on the rate of requests registered, this function estimates the royalties the data will generate once supplied. The more requests in a period of time the greater the expected pay-off. The expected pay-off is announced to each requestor of the data. The beauty is that each requestor will have to find the data anyway elsewhere. To collect the pay-off, a requestor has only to call SODB back and input the answer. A sensitive and potent feedback loop is created insuring that the more a piece of data is requested the more likely it will be supplied by a requestor or by someone a requestor tells of the pay-off.

DESCRIPTION OF THE PREFERRED EMBODIMENT

Figure 1:
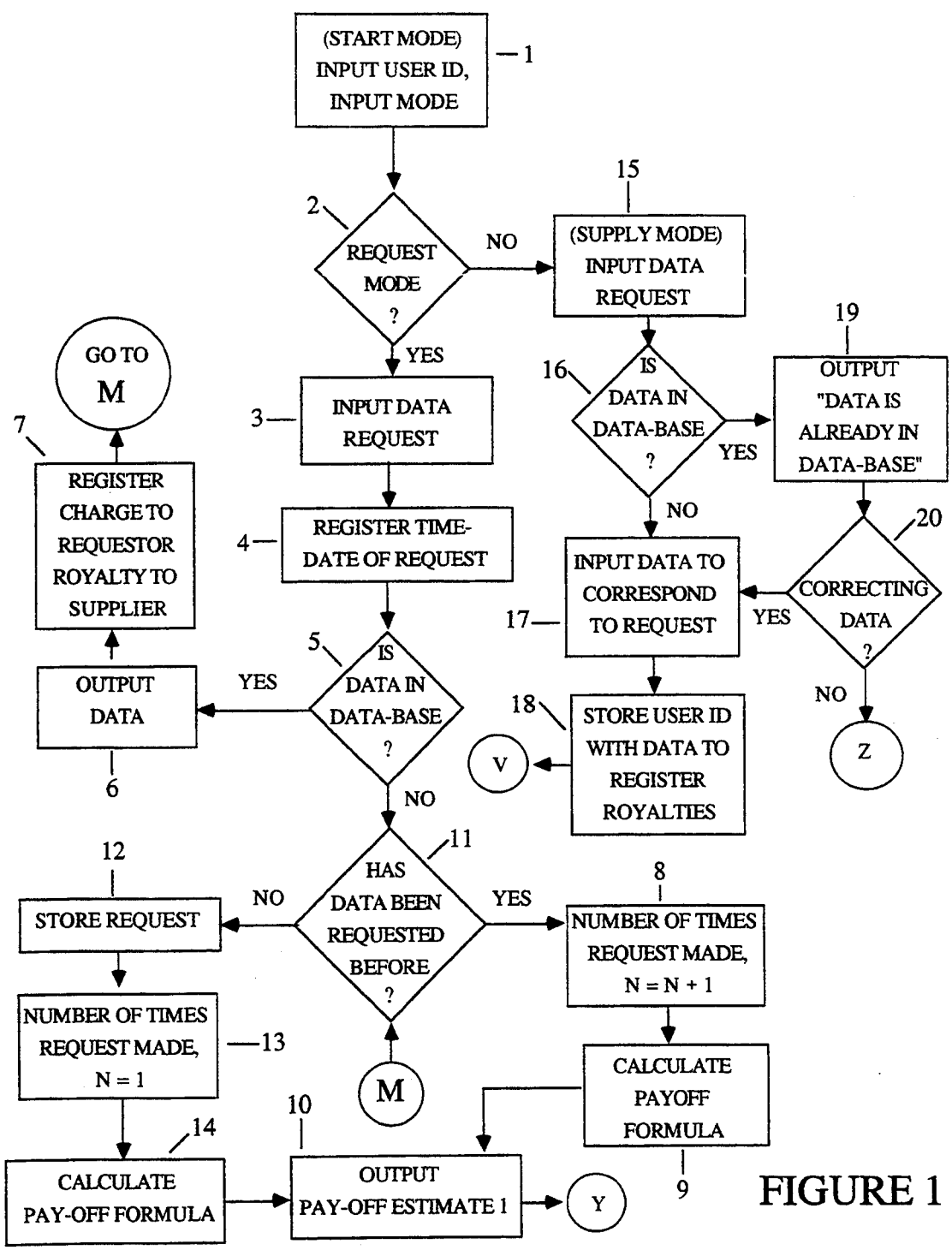
FIG. 1 shows a flow chart of a basic SODB.

The SODB is a dam-base that charges users for the data they receive and pays royalties to users who input that data. What differentiates the SODB from other data-bases is a function that tells users who request data what the estimated royalty value is for supplying the data. The function keeps track of the rate of requests for the data and from this rate projects a demand rate. The estimated demand multiplied by the royalty rate yields a projected royalty stream. If a person requests a piece of data that is not in the SODB, the SODB outputs the projected value of inputting the data. (If the person finds the data answer is in the SODB, the SODB still can output the projected royalties for improving, correcting or updating the data.) Then, if necessary, the SODB tells users how to input the data. In sum, the SODB is a powerful feedback system that tells users as to what data needs supplying, tells them the financial incentive to supply it, tells them how to supply it and then pays them for supplying it.

Definitions and Comments

Start Mode: The procedure the SODB executes to allow users to access the SODB and choose between the Request and Supply Modes.

Request Mode: The procedure the SODB executes to provide answers and/or Pay-off estimates to Requestors. In the Request Mode, a user inputs a question causing the SODB to search for the corresponding answer. If the answer is not found, a Pay-off estimate is outputted. If the answer is found, the answer is outputted along with the Pay-off estimate (see Pay-off Meter) and a Charge is registered to the user.

Supply Mode: The procedure the SODB executes to allow users to input answers, potential answers and raw dam. User identification data is registered along with the inputted data so that the user can be credited with royalties each time the data is used to supply answers.

Requestor: User who accesses the SODB by Request Mode seeking an answer. The Requestor owes a Charge if the answer is found.

Supplier: User who enters the Supply Mode to input an answer or raw dam. The Supplier gets paid a Royalty each time the answer or the raw data is used by the SODB as determined by the royalty rules of the SODB.

Charge: The amount owed by a Requestor who receives an answer from the SODB.

Royalty Rules: The rules, embodied in functions, that determine the amount due to a Supplier of an answer (or of the raw data that is necesary for an answer), each time that answer is outputted to a Requestor.

Payments Register: The function the SODB executes to register payments owed by Requestors and payments due Suppliers. When an answer is outputted, the Payments Register registers who is owed a royalty for the data used and who owes a charge for the answer received. What the Payments Register registers depends on the royalty rules and the classification system of the SODB (see Classifying a Data-Use). Data may be used but not registered for the purpose of paying royalties. For example, a function may average the ages of ten thousand people. Thus, ten thousand ages are used. The SODB may not consider these data-uses for the purpose of royalties.

Question: specific data corresponding to other specific data called the answer. When entered into the SODB by a Requestor, causes the SODB to search for the corresponding answer.

Answer: Specific data corresponding to other specific data called the question. An answer may be static, for example, the chemical structure of gasoline does not change. It may be dynamic, for example, the price gasoline does change. And, it may be improvable as well, for example, the octane of gasoline may be more accurately given. An answer may be long or short. It may have one component or many. For example, the question, "What are the Chinese restaurants in Biloxi?" may yield one restaurant or many.

The Correspondence Between a Question and Its Answer: There can only be one answer for any question, though that answer may have many components. Users input the answers they deem best. And users police the accuracy of those answers. The SODB accepts untrue or approximate answers, for it cannot divine meanings and truth, but any answer is displaced by a better answer. A better answer is one that, by convention and by the rules of the SODB, satisfies a question better than the existing answer. A user may displace one answer with another. If there is a dispute between users as to which answer is better, a neutral third party, the Data-Base Manager can be alerted to settle the dispute.

Of course, with many types of questions, whether an answer is "better" is not clear by convention. There may be many, even an infinite number of equally good answers. So, depending on the type of question, the SODB rules must limit the possible answers. One rule, for example, may be that the first answer inputted is considered better than all equivalent answers. However, no set of rules can capture truth and therefore, the manager, has final authority to decide whether an answer is true or not and whether one answer is better than another. See also Quality Control Functions below.

Potential Answer: An answer that may become the best answer in the SODB to a question.

Raw Data: If it has the requisite functions, the SODB can process mw data to arrive at answers. A piece of mw dam may itself be considered the answer to a question. For example, the question, "What is the closest McDonalds to 1234 Main Street?," might require the SODB to have map coordinates for 1234 Main Street. Therefore, the coordinates are raw dam. And, the coordinates themselves are the answer to the question, "What are the coordinates of 1234 Main Street?." Any answer for one question may be raw data for answering other questions.

Question Splitter: A type of function that takes a question inputted by a Requestor and breaks the question into specific sub-questions, specific data-requests for pieces of raw data. For example, a question may be, "What taxes do I owe?" The sub-questions may be, "What is your tax rate?" and "What is your income?" There can be infinitely many question splitters depending on the type of question entered.

Storing Answers: Usually, the SODB simply lists an answer under the question it answers. The answer can then be accessed by simple lookup. Answers can also be stored as raw data that is processed.

Storing Potential Answers: Potential Answers can be stored as raw data.

Storing Raw Data: A piece of raw data can be inputted and stored as an answer to a sub-question. Or, the data can be stored in other ways, depending on the functions that process it.

Data-Request: Any search for data initiated by a Requestor inputting a question. An infinite variety of searches can be done for data including searches that invoke functions to yield data.

Classifying a Data-Request: The SODB classifies data requests in order to differentiate between them and count them. However, as in any classification system, arbitrary rules must be established. SODB's classification of requests can therefore be infinitely variable. A common choice is whether to classify a request as a whole question or to break it up into sub-questions (see question splitter). The SODB may classify a question both ways.

Data-Use (Use): When the SODB uses a piece of data as an answer or to arrive at an answer. Data-uses broadly fall into two types:
a) outputting the data as an answer or as part of an answer,
b) plugging the data into an algorithm that outputs the answer.

Classifying a Data-Use As there are infinite algorithms and infinite types of answers, there are also infinite uses of data. The SODB has rules to classify these uses for the purpose of tallying the uses and paying royalties. For example the use of pi may be given a different royalty value than the use of the date of Lincoln's Birthday or the use of a passage from Shakespeare. As in classifying data-requests, there are no hard and fast rules.

Pay-off Meter (POM): The function that is the heart of the SODB. The POM has three sub-functions:
1) The Demand Meter (D-Meter), which tallies Data-Requests and Data-Uses over time to come up with an estimated demand rate for an answer (or for a piece of raw data),
2) The Pay-off Formula (POF), which takes the demand rate and calculates a Pay-off Estimate (POE) of the income a user will get for inputting the answer (or the data),
3) Input Signal (I-Signal), which outputs the POE and the answer (or the data) that may need inputting and, if necessary, instructions on how to input the answer (or the data).

The POM works most simply when the SODB's answers are listed under questions and the SODB can find the answers by simple lookup. For example, a Requestor may input the questions, "What is Lincoln's date of birth?." The SODB will do a lookup. Initially, the answer will not be in the SODB. The SODB will then store the question and tally each lookup. The SODB will also register the time of each lookup so that the rate of lookups over time will be known. The rate of lookups (the demand rate) for the answer will be fed into the POF to yield the POE. The I-Signal outputs this POE to every Requestor. Since, answers are listed under questions, the I-Signal need not tell what answer need inputting nor how to input it. It is assumed that Requestors implicitly know that to enter an answer, they simply access the Supply Mode, enter the question and then enter the answer. Once the answer is inputted, the D-Meter still keeps track of the demand rate because the answer may be wrong. The POM is then still able to provide Requestors with the POE for correcting the answer.

When the SODB simply looks up answers, dam-requests and dam-uses can be measured by tallying lookups. The SODB can get more complicated though because the classification of data-requests and dam-uses can get complicated. POM functions are discussed below, taking into account the issue of classifying data-requests and data-uses.

Demand Meter (D-Meter): The function that tallies data-requests and data-uses along with the time they take place in order to calculate the demand rate for a piece of data.

The D-Meter tallies:

a) data that is specifically searched for by name and not found. For example, a user may request a businesses phone number which is not in the SODB. This data-request can be tallied under the businesses name;

b) data that is used but not specifically searched for by name. For example, a user may request the average price of airline tickets to Boston. Dozens of prices may be fed into an averaging function to answer this request. Each of these prices is used but has not been specifically requested by name.

c) data that is searched for by name and used (found). In these cases, the D-Meter only counts once. It does not count both the search and the find.

As discussed above, them can be an infinite variety of ways of classifying data-requests and data-uses, therefore, the D-Meter itself can be infinitely variable.

The key to the D-Meter is that it tallies data-requests and data-uses for data that satisfies two conditions: royalties are paid on the data and users can be instructed to input the data. The point of the D-Meter is to measure demand for specific data so that the demand rate can be fed into the POF which then yields the value of inputting that data. There would be no point in tallying requests for and data that could not be named and therefore not be inputted by users. (Aside: The payment register may tally uses that the D-Meter does not tally.)

The D-Meter is only a guide, it cannot measure the demand for all types of data that may be input into the SODB. For example, it is important to note that the D-Meter cannot measure the demand for potential answers. But, by measuring the demand for actual answers, the D-Meter can give users an idea of what the potential value is of inputting a potential answer. An example will illustrate both this situation and the issue of classification.

Assume the question inputted by a Requestor is, "What store has the lowest price on Sony Camcorder #1239?" Say there are 1,000 requests. Now it may be that ten stores have the same lowest price. What then is the demand for a given store? That depends on how the SODB classifies the answer. The SODB may have a rule that only the first store with the lowest price can be outputted as the answer. This store becomes the answer and all royalties go to the inputter of this store. The SODB in effect turns the data-request into, "What stores have the lowest price and which among them was entered first?" Of course, the Requestor does not care which was entered first but the SODB may have default assumptions built into it to limit the size and number of answers outputted. Therefore, all other stores, even though they have the same lowest price are only potential answers (the first store may change its price so that another store takes its place). An inputter of a store with the lowest price does not know whether that input will generate any royalties or not. There is no established demand for that store.

On the other hand, the SODB can have role that all stores with the same price are equally part of the answer so the answer then has ten components. The demand rate for the store with the lowest price is then divided by the number of components to arrive at a demand rate for each component (this calculation may actually be part of the POF). The classifications can be even more complicated. The second store inputted may be considered different from the first, location of the store may matter and so on. The point is that the D-Meter tallies according to what data receives royalties and that depends on how answers are classified and that can be infinitely variable.

Pay-off Formula (POF): The function that calculates a Pay-off Estimate (POE). The POF projects future demand for a piece of data based on the demand it has had in the past. Thus two variables are critical, N, the number of times the data has been requested and, T, the time period over which those requests have taken place. Based on the rate of requests for a piece of dam, the POF estimates how many future requests there will be and then multiplies that by a royalty rate to arrive at the POE. When a piece of data is already in the SODB, the POF uses the tally, N, of data-requests and data-uses as supplied by the D-Meter.

Like any equation for a projection, the Pay-off formula can be infinitely diverse based on historical data. For example, the formula would include a historically based assumption of when demand would end. The POF may contain estimates not based on the actual demand rate for a specific piece of data but for pieces of data that are similar. Regardless of what historical assumptions are built into it, the POF is always a function of the demand rate. The values for N and T are plugged into the POF which has the royalty rate already built in.

The royalty rate can, of course, be infinitely variable. There may be sliding scales for the royalty paid to an answer for example. And different dam-requests and data-uses may have different royalty rates. (Technically, it is possible for the POF not to have a royalty rate and only calculate a projected request rate. In this case, the royalty rate would be known by users who could do their own calculations.) Also, the POF must have an arbitrary value for the POE when a piece of data has been requested zero times or one time. This value could be an amount or simply a message like, "POE unkown."

I-Signal: The function that is the output part of the POM, the signal that tells Requestors what data is needed, what the value is of supplying it and how to supply it. When a Requestor requests an answer not in the SODB, the SODB outputs the POE. When a Requestor requests an answer that is in the SODB, the SODB outputs the answer and the POE for correcting, updating or improving it. (The POE may be outputted only upon request rather than automatically).

When the I-Signal ouputs the POE it may also output the answer needed or the data needed. Usually, the answer needed is implicit from the question asked. If raw data is needed, the data needed may not be implicit from the question. In this case, the I-Signal would output the type of data needed as well. For example, "Need Answer to, 'What is the speed of light?', POE: $2." Finally, if necessary, the I-Signal outputs instructions on how to input the data.

A basic SODB includes Of the following elements and procedure as shown in FIG. 1.

SODB Elements

Computing means for executing SODB functions.

SODB functions a) inputting, storing, deleting and outputing dam.
b) start mode
c) request mode d) supply mode
e) lookup
f) registering charges
g) registering royalties
h) Pay-off Meter (POM)

SODB Procedure

Start Mode

1) User inputs user identification dam, SODB stores it 1
2) User inputs supply or request command 1, SODB accesses appropriate mode 2.

Request Mode

1) Requestor inputs a Question 3, SODB
   a) registers date-ti me of Request 4
   b) executes a look-up 5.
2) If the SODB has the Answer, it
   a) outputs the Answer 6
   b) registers a payment due by the Requestor 7
   c) registers a royalty due to the Supplier 7
   d) adds one to the number of requests for that question 8, calculates the POF 9
   e) outputs POE 10.
3) If the SODB does not have the answer it invokes the POM function which
   a) checks if the Question is already stored in the Pay-off register 11 (has been asked before)
      a1) if no, stores the Question 12, sets the number of requests for that question to one 13, calculates the POE using the POF 14
      a2) if yes, adds one to the number of requests for that question 8, calculates the POE using the POF 9
   b) outputs the POE to the Requestor 10.

Supply Mode

1) Supplier inputs a question 15, SODB executes a lookup 16 (this lookup is not counted as a data-request; only lookups in the Request Mode are so counted in the POM),
2) If the answer is not found, the supplier inputs the answer 17, SODB stores the answer to correspond with the question inputted and stores the Supplier ID data along with the answer 18, in order to credit the Supplier with a royalty each time the Answer is requested.
3) If the answer is found, the SODB outputs a message saying the answer is already in SODB 19, if the Supplier intends to correct the existing answer, the Supplier inputs a command such as, CORRECT 20, and the SODB allows the new answer to replace the old 17 and new supplier ID Clara to replace the old as well 18.

These elements and procedure are the heart of the SODB. The SODB would usually include other useful functions. Before detailing some oft hem, an embodiment of the basic SODB is described, a self-filling telephone directory (the SFTD). Then an embodiment is described which does more than lookup answers under questions.

1. The SFTD includes a list of names and addresses and corresponding telephone numbers, initially empty, a computer for storing the list and functions for inputting data into the list, outputting data from the list and looking up data in the list.

2. The SFTD also has a sign-on function that allows users to identify themselves for billing and payment purposes. The SFTD stores the ID data.

3. Users access the SFTD over the phone. The SFTD computer is equipped with phone-interface equipment (for example, a Dialogic card). The SFTD accepts calls from two lines, a Request line and a Supply Line. The Request line automatically puts users in the Request mode, while the Supply Line puts them in the Supply Mode.

4. Using the Request mode, a Requestor accesses the SFTD list by spelling a name and address over the phone into the SFTD's computer. Equipped with a speech recognition function, the SFTD recognizes the request and does a lookup. Equipped with a speech synthesizer, it then responds with a speech synthesized answer.

5. If the the SFTD has a number corresponding to the name and address, it outputs the number and registers the charge due by the Requestor and the royalty due to the Supplier. One is added to the POM tally of data-requests and a new POE is calculated and outputted along with the number.

6. If not, SFFD's POM is invoked and outputs a POE to the Requestor. The POM has several functions: a) it registers the time of the request, b) it checks if the request has already been stored in the POM register, c) if not, it sets the request tally to 1, stores the request and defaults the POE to the message "Insufficient Data to Estimate Pay-off," d) if the request is already stored, the POM advances the request tally by one and then calculates the POE using the POF (the POF divides the number of requests by the time period of those requests and then assumes that this rate will continue for 4 years. The formula then multiplies the number of requests over those four years by the royalty rate per request to arrive at the POE), e) outputs the POE.

7. A Supplier accesses the SFTD by spelling a name and address over the phone into the SFTD. The SFTD's speech recognition function recognizes the request and the SFTD does a lookup to see if a corresponding telephone number is already in the list. If the number is not in the SFTD, the SFTD allows the Supplier to enter the number and stores the Supplier ID data along with the number in order to properly credit royalties. If the number is already in the SFTD, the the SFTD outputs a voice synthesized message, "Number is already in directory." If the number needs correcting, the Supplier then enters the command, CORRECT. The SFTD allows tile Supplier to input the number using the SFTD's speech recognition function. The SFTD stores the number to correspond to the question, to the name and address that is, and also stores the Supplier's ID data with the number, in order to properly credit royalties.

Figure 2A:
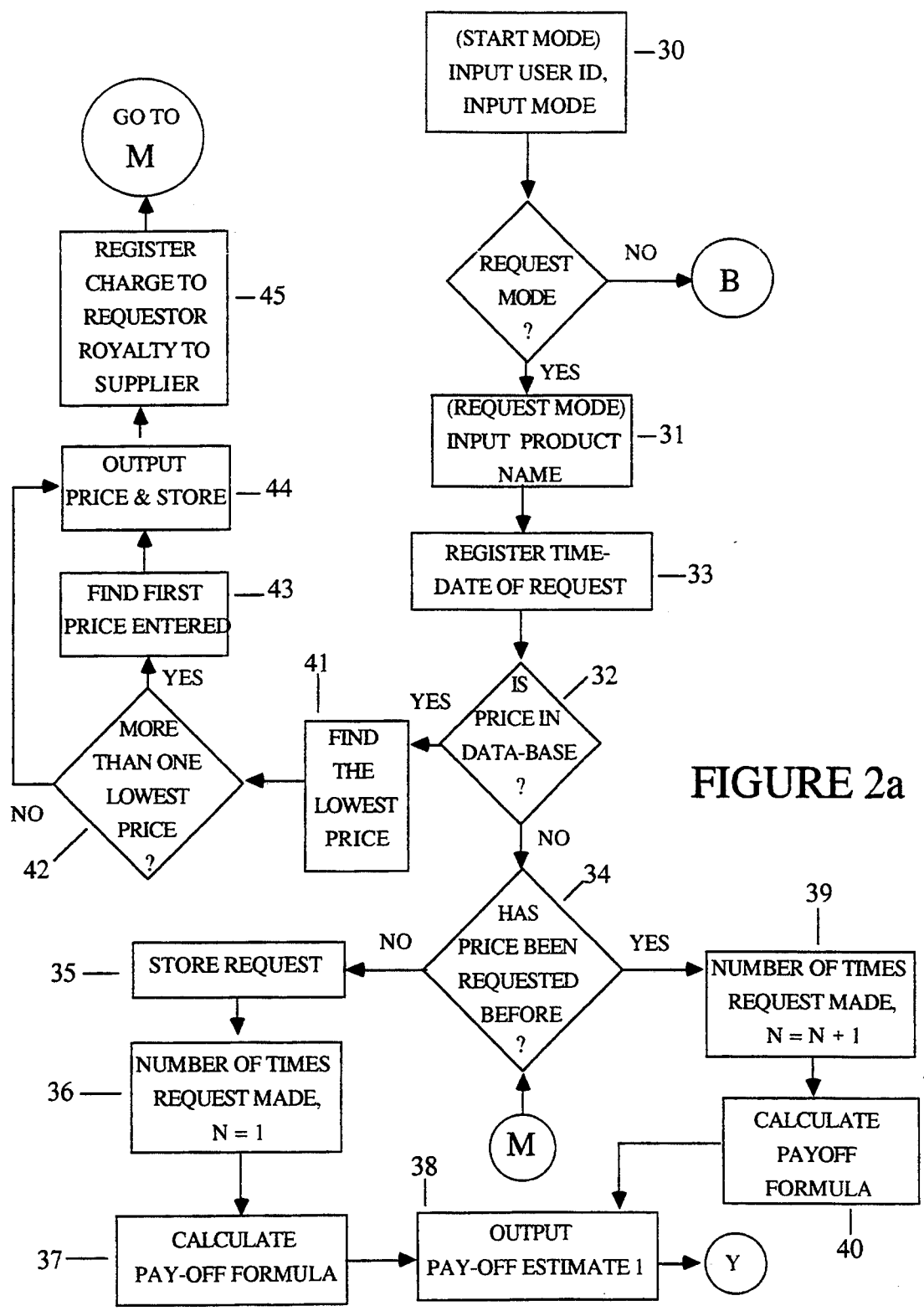
FIGS. 2a shows the flow chart of the Request Mode of a lowest price locator.
Figure 2B:
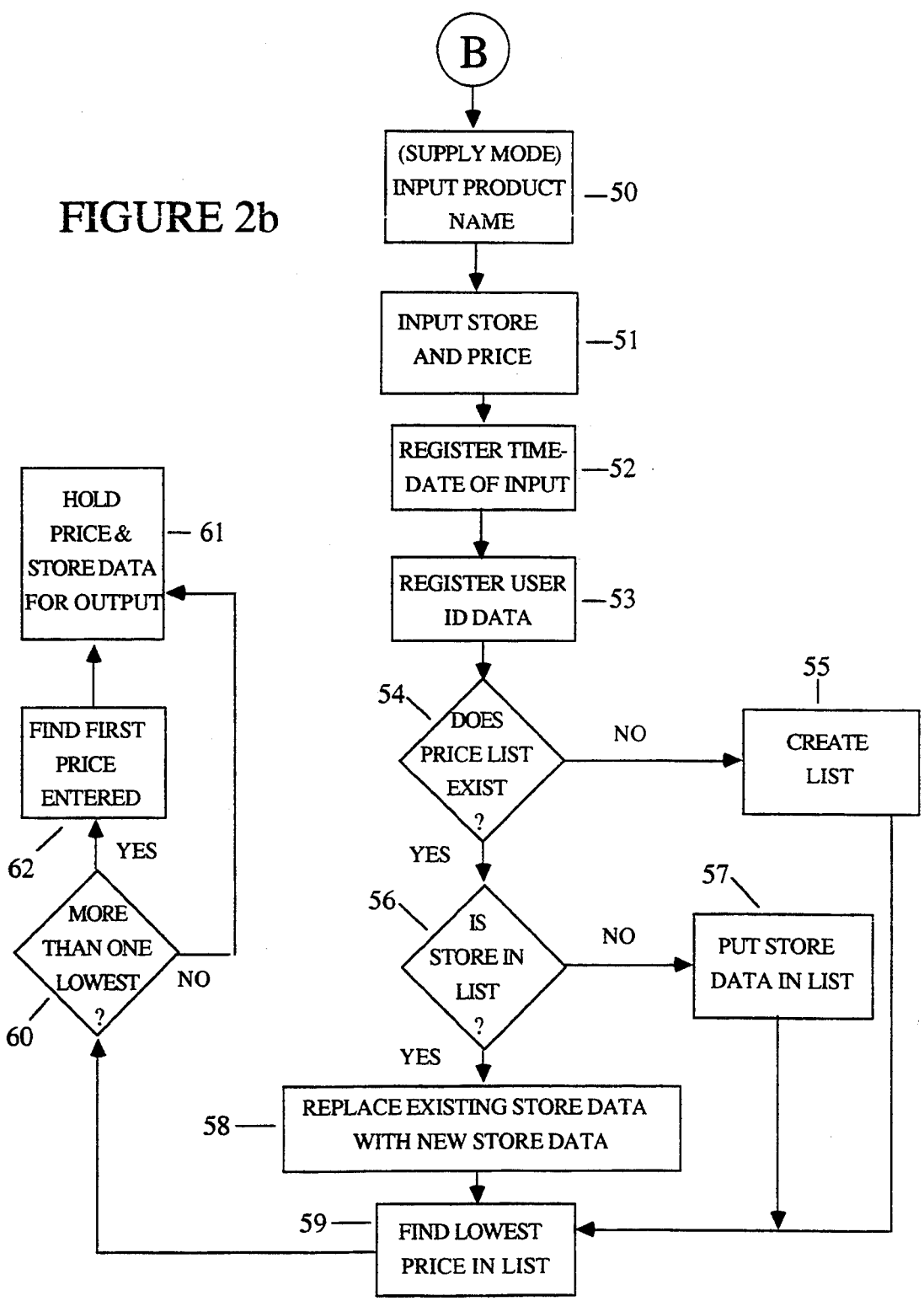
FIG. 2b shows the flow chart of the Supply Mode of a lowest price locator.

Let us now look at a different embodiment, a lowest price locator as shown in FIGS. 2a and 2b.

1. A lowest price locator (LPL) includes a list of product names and corresponding prices and stores, initially empty, a computer for storing the list and functions for inputting data into the list, outputting data from the list, looking up data in the list and processing data in the list.

2. The LPL also has a sign-on function 30 that allows users to identify themselves for billing and payment purposes. The LPL stores the ID data.

3. Users access the LPL over the phone. The LPL computer is equipped with phone-interface equipment (for example, a Dialogic card). The LPL accepts calls from two lines, a Request line and a Supply Line. The Request line automatically puts users in the Request mode, while the Supply Line puts them in the Supply Mode.
4. Using the Request mode, a Requestor accesses the LPL list by spelling a full product name over the phone into the LPL's computer. Equipped with a speech recognition function, the LPL recognizes the request 31 and checks 32 to see if the price is in its data-base.
5. The LPL registers 33 the time of the request.
6. If LPL finds no list of stores and prices under the product name, it checks 34 to see if the price has been requested before. If not, it stores the request 35, sets the request tally to one 36, calculates the POE 37 and outputs the POE 38. If so, it advances the tally 39, calculates the POE 40 and outputs the POE 38.
7. If LPL finds a list of stores and prices under the product name, it checks 41 for the lowest price. If it finds 42 more than one store has the same lowest price, it finds 43 the store whose lowest price was entered first and outputs 44 that store and its price. If not, it outputs 44 the single lowest priced store and its price. It then registers 45 the charge owed by the Requestor and the royalty owed the Supplier. It then advances the request tally 39, calculates the POE 40 and outputs the POE 38.

Supply Mode

8. A Supplier accesses LPL by the Supply Mode and spells a product name over the phone into the LPL. The LPL's speech recognition function 50 registers the name and allows the Supplier to input 51 a store and price
9. The LPL registers 52 the time of the inputting along with the store and price.
10. The LPL registers 53 the user's identification data along with the store, price and time.
11. The LPL checks 54 to see if there is list of stores and prices under that product name. If not, the LPL creates a list and stores the data in the list.
12. If the LPL already has such a list, the LPL checks 56 to see if the store inputted matches any store in the list. If not the store, price, time and user ID data are stored 57 in the list. If so, the data just inputted and registered is put in the list in place 58 of the data registered with the matching store.
13. The LPL finds 59 the lowest price.
14. The LPL checks 60 to see if there is more than one lowest price. If not, the single lowest price is held 61 for output. If so, the LPL finds the first price entered 62 and holds 61 it for output.

Additional Functions

An SODB should include more functions than the basic ones described above. Some useful functions are are described below.

Matching Functions

The SODB is a matching machine in two senses, both critical. First, it matches questions (data-requests) and keeps a tally of how many times the same, matching questions have been asked. Second, it matches answers to questions. In both types of matching, problems can arise due to the nature of language and the nature of questions and answers themselves. Therefore, the SODB should have functions to increase the chance of accurate matching. These functions address two fundamental problems described below. SODB cannot solve these problems but can mitigate them by incorporating approaches conceived by past data-base designers who have struggled with these problems. Examples of such approaches are best match algorithms.

a) Infinite Ways to Ask the Same Question

There are multiple, in fact infinite, ways to ask the same question. Two questions that have the same meaning, may not be matchable because they have a different form. And so, the goal of the SODB is to try to make questions with the same meaning take on the same form. The SODB can therefore have a function that takes a Requestor through a standard input structure so that Requestors have a better chance of posing Questions in matching forms when the questions have the same meaning. This structure is easiest with simple questions such as, "What is the telephone number of John Smith?" A Requestor might simply input the name "John Smith," which would of course, match other inputs of "John Smith." This example brings us to the next problem.

b) Questions Can Have Multiple, and Possibly Infinite, Answers

To match an answer to a question, there needs to be a single answer. For example, a person entering "John Smith" looking for a number might find hundreds of numbers. In fact, most all questions can have multiple answers, even seemingly specific questions such as, "What is John's weight in pounds?" The answer may be 150 or 150.11 or 150.1111, and then any figure depends on when he was weighed, with what scale, and so on. To narrow answers down, we use implicit default assumptions, some of which we build into our data-bases. In addition to these assumptions, the key to narrowing possible answers is to specify enough information in a question to make it highly likely that only one answer will be given. Specifiers such as full name, location, ID number, time, source of information and so on can often narrow the possible answers to one. The SODB can include a function that asks the Requestor to pose the question more specifically. The SODB can also include a function that picks one answer out of a set of equivalent answers. For example, the answer to the question, "Where is the lowest price a certain compact disc?" might be many places. The SODB might pick one at random.

Quality Control Functions

Quality control of answers in the SODB is essential. The SODB can have many functions to provide incentives and sanctions that encourage Suppliers to provide accurate answers. A general incentive is that a corrected answer will displace a wrong answer and garner roylaties. The SODB may have rules to define what a wrong answer is but these rules cannot cover all situations. Disputes may arise as to whether answers are accurate and these dispute may have to be settled outside the system by the Manager of the SODB. Some quality control functions are listed below.

a) The SODB can have a function that stores identification information about an Answer such as the time it was supplied and the primary source (the primary source and the Supplier may or may not be one and the same).

b) The SODB can have a function that allows users to input a claim that an answer is wrong and send that claim to the Manager.
c) A user, Requestor or Supplier, can claim that an answer was intentionally supplied wrongly. The SODB can have a function that allows a user to record this claim and send it to the Manager.
d) the SODB can have a function that allows a user to request that a manager inspect an answer. The function can also register a charge for this inspection.
e) The SODB can have a function that allows the Manager to register that an answer is wrong and to register that wrong to a Supplier.
f) The SODB can have function that keeps a record of the wrong answers a Supplier has provided. This function can also disqualify a Supplier who has inputted too many wrong answers.
g) The SODB can have a function that charges Suppliers an amount of money, a penalty, for providing wrong answers.
h) The SODB can have a function that rewards a user whop discovers that an answer is wrong. Such a function can charge a penalty to the Supplier of the wrong answer and pay the penalty fee to the discoverer of the incorrect answer.
i) The SODB can have a function that pays Suppliers to update answers. Let us call such a Supplier an Updater. For example, a price that was originally entered correctly might become outdated. A user who discovers this can be paid for changing the anwer to a correct one. The user would be paid royalties that the new, correct answer would generate. However, sometimes, when an answer is changed, it may receive no royalties. This is particularly true with prices and other time sensitive offers. For example, the answer to the question "Who sells HP printers for the lowest price?" might change. The Updater might find out that the current answer in the SODB is wrong. But the Updater might not be able to Supply the correct answer. That may have been supplied by someone else. In these cases, the SODB can have a function that pays the Updater a share of the Royalties owed to the Supplier of the new answer and/or of the old answer. Or the SODB may be able to credit the Updater in other ways, such as crediting him with free answers.
j) To cheat, a person might have a confederate change an accurate answer to a wrong one. The person would then re-enter the answer correctly and claim royalties. The SODB can have a function such that if an answer reverts to a previous answer within a given period of time, royalties will be paid to the Supplier of the previous answer, provided the previous answer was accurate. With static facts, such as a person's birthday or the speed of light, the first person to supply the answer accurately would usually claim all royalties. With changing facts, such as prices, the time allowed for reversion could vary depending on the situation.
k) The SODB can have a function that "confirms" answers by making sure that they are outputted to Requestors only after having been inputted by more than one Supplier.
l) The SODB can have a function that allows Suppliers to enter answers only after having entered a pass code.
m) If accessed by voice, the SODB can have a function that records the Supplier's voice for identification.
n) The SODB can have a function that audio records the Supplier receiving an answer from the primary source of that answer. For example, a Supplier could be getting a price from a store. In order to insure that the store cannot renege on this price, the Supplier might want to record the conversation. Thus the SODB can have a call forwarding function in which the Supplier calls through the SODB, the SODB connects the Supplier to the store and then also records the conversation. To reduce recording costs, the recording might be done randomly.

Deleting Data Function

The SODB can have a function to get rid of "deadwood" by deleting answers, raw data, data-requests and data-uses whose demand rate drops too low. For example, the SODB can automatically delete any answer that has not been requested or any question that has not been asked for a period of time.

User Fees Functions

To offset costs and to encourage efficient use, the SODB can have a function that charges users for connect time, for the storage of answers and for any other useage of the data-base.

Pay-off Meter Functions a) A user might prefer not to have the POE outputted automatically but instead upon request. Therefore, the POM can have a function that allows Requestors to request a POE.
b) A function can be added to the POM that tells not only the Pay-off Estimate but also an estimated per hour ram. Thus the Pay-off Formula would have to include an estimate of the time it takes to input the necessary dam. From this estimate, a per hour estimate follows.
c) The Pay-off Formula can calculate a second POE, one that is a percentage of the original POE and could be called a Referral Fee. This fee would be due a person, a Referrer, who alerted a Supplier to enter an answer. This function would allow a Supplier to input the name of the Referrer. The function would then credit royalties to both the supplier and the referrer. These two would normally share the original royalty amount.
d) The Pay-off Formula can calculate the Pay-off per component in an answer. The Pay-off Formula in this case could, for example, simply take the POE and divide it by the number of components, x, in an answer. The SODB would also have a function that tallies the components.

Requestor/Supplier Functions a) A Requestor may not want to supply certain data because another Requestor might beat him to the punch. Therefore, the SODB can have a function that reserves the right to input the data. The Requestor could enter a command, such as RESERVE, after heating the POE for the data. The function would store the Requestor's ID data along with the Requestor's question. Then, for a period of time, the SODB would allow only that user to enter the necessary data. This function would also alert other users that the data was reserved for that time.
b) A Requestor who becomes a Supplier may not want to bother re-entering a Question that he previously asked when in the Request mode. The SODB can then have a function whereby this user, when in the Request mode, could enter a command, such as "WILL SUPPLY", after hearing the POE for the answer. The function would store the Requestor's ID data along with the Question. Then, when the user is in the Supply mode, the function would, upon a command, such as PREVIOUS, look-up the last question that the user had asked. The data inputted by the user would then be stored to correspond to that Question.

c) A user who intends to be a Requestor might enter the Supply Mode, using that mode to check whether an answer is present in the SODB. (A user can check whether an answer is present using the Request or Supply Mode.) If the answer is present, the SODB can have a function that allows the user to automatically switch modes upon a single command and have the answer automatically outputted and a charge registered to the user. This function may seem trivial but an important issue lies behind it. The SODB is a feedback system different from other data-bases in that it forms a fight feedback loop based on royalty incentives provided to users who normally would pay to receive data. With certain data-bases, suppliers, who do not pay for receiving data, may be able to check on the potential royalty revenue from a piece of data. But, for the first time, with an SODB, this pay-off information is made directly available to users who are seeking data and who are charged for it if it is in the data-base. This fact makes all the difference for it creates a tight, efficient feedback system that is new.

Probabalistic Payment Functions

If payments and royalties for data are quite small, it is very advantageous to use an expected value payment method (EVPM). An EVPM is described in U.S. Pat. No. 5,085,435. Please see this patent for an explanation of the method.

The main question in an EVPM is how to insure fair bets. In this case the bets are between the SODB and its users, both Requestor who owe money and Suppliers who are owed money. We will take the case of Requestors who owe money. The principles involved extend to Suppliers. Two efficient ways to prevent cheating are described below.

Numbers Game Method: In the illegal Numbers Game, results were often determined by one number, for example the last three digits of the handle at the track. Anyone who picked that number would win. Thus, one number decided thousands of bets. Likewise the SODB's Payments Register can set up EVPM bets with each Requestor. Charges registered one day can all be decided by the daily lotto number the next day. For example, assume the stakes are set at $10.00. The bet then is decided by the last three numbers in the daily lotto. (See EVPM patent). So, the Payments Register register the charges owed by all requestors during one day. Then the next day, the daily lotto number is announced. The Payments Register takes this number and applies it to every bet is made with Requestors on the previous day.

The only problem with such a method is that it can truly be feast or famine. For example, assume all charges one day are 10 cents. The SODB only has a 1% chance of winning bets if the stakes are $10. Therefore, the SODB stands a 99% chance of getting nothing and a 1/100 chance of getting 100 times its money. In order to even out the income stream, the Payments Register might assign to each Requestor an extra number to be added to the lotto number. The extra number might be part of the Requestors ID number, for example. These extra numbers would be random or nearly so and would thus even out the wins and losses from bets. As long the extra numbers are agreed upon by Requestors before the lotto number is announced, all is fair.

Probabalistic Metering Method: Normally, when people use an online dam-base or phone system or any usage sensitive system, there is a metering component that measures usage and ultimately determines charges. The SODB has that with its Payment's Register. However, registering charges and then billing for them can be a large cost. Therefore, it would be advantageous to do the metering on a probabalistic basis by EVPM. For example, the meter might be off 90 percent of the time but, when on, the charges applied would be at 10 times the normal rate. The periods of time the meter is on and off are determined by a random number supplier that picks a number, in this case an integer from 1-10.

The SODB's Payment's Register can have a Probabalistic Metering Function (PMF) that randomly determines the time periods during which the SODB will register charges to Requestors (and register royalties to Suppliers). The function is described below.

1. A period of time is broken up into sub-periods. For example, a day might be broken up into minutes.
2. The probability that the meter will be on during a sub-period is decided upon by the SODB manager.
3. Each sub-period has assigned to it a random number that determines whether the meter will be on or off during that period. The number i s chosen by a random number generator such that the probability of the meter being on is the probability that the SODB manager has decided on. With each sub-period having a random number chosen, a sequence or list of "ons" and "offs" is created. This list is inputted into the PMF.

(The list is supplied by an independent source that generates the numbers. The independence of the source is necessary to verify whether or not the SODB's sequence if fair.)

5. The PMF has a clock and a sub-function that, upon the clock's arriving at each sub-period, checks the list to determine whether the meter should be on or off. The sub-function turns the meter on and off as determined by the on/off list.
6. The clock is synchronized to an independent clock so that fairness can be assured.
7. When the meter is on, the Payment Register registers charges and multiplies them by the inverse of the probability that the meter would be on. Thus, if the meter is to be on 1/10 of the time, the charges would be 10 times normal.

Probabalistic metering by this method offers an efficient way to insure fair bets and also a way to smooth out the wins and losses from bets. Perhaps more importantly, it allows Requestors not to have to input the ID data unless they loses bets. There is no reason to input one's identity if one does not have to pay. Thus the inputting of ID data is eliminated from the Start mode. This can be a very advantageous for people in a hurry. It means they only have to identify themselves for billing purposes when they lose the bets. Of course, people might not pay if they haven't identified themselves. However, in addition to honor, it is possible to gather evidence to trace Requestors. It is possible to capture the Requestor's voice, for instance, if the SODB is accessd by voice. If the SODB is accessed by computer, the computer may be traced.

I claim:

1. A data collection and retrieval system comprising in combination the following elements and steps:

a computer and a database with:
- input means for inputting data-requests and data corresponding to said data-requests, along with user identification information,
- output means for outputting said corresponding data, along with projected pay-off estimates,
- memory means for storing said data-requests and corresponding data,
- processing means for comparing data-requests, finding corresponding registering times of inputs, calculating formulas and registering charges and payments due to users, said computer performing the following steps upon the inputting of a data-request by a user;
- a. registering said user's identification information in said database,
- b. registers users preference in supplying and retrieving the data corresponding to said data-request,
- c. if the user prefers to supply said corresponding data, looks for said corresponding data in said database
  - c1. if corresponding data is found, outputting a message telling the user that the data is already in said database
  - c2. if no corresponding data is found, allowing the user to input the data, storing the corresponding data, and registering that royalties are due to the user upon data-request,
- d. if the user prefers to retrieve data corresponding to said data-request,
  - d1. registering time and date said data-request is inputted,
  - d2. finding if data corresponding to said data-request is in the database,
    - d2a. if corresponding data is in the memory, outputting the data, registering a charge due by said user who inputted the data-request and a royalty due to the user who supplied the data, adding one to the number of said data-requests, calculating a pay-off formula that projects the estimated royalties due to the user who inputs the correct data corresponding to said data-request, and outputting the resulting pay-off estimate,
    - d2b. if no corresponding data is in the database, checking if said data-request is stored in the database,
      - d2b1. if no, storing the data-request and setting the number of said data-requests to one, and calculating said pay-off formula,
      - d2b2. if yes, adding one to the number of said data-requests, and calculating said pay-off formula,
      - d2b3. outputting the resulting pay-off estimate.

* * * * *